United States Patent [19]

Grossman

[11] Patent Number: 5,223,837
[45] Date of Patent: Jun. 29, 1993

[54] ANTI-EXPLOITATION METHOD AND APPARATUS FOR CONTROLLING AIRCRAFT IFF

[75] Inventor: Sidney J. Grossman, Ocean, N.J.

[73] Assignee: The United States of America as represented by the Secretary of the Army, Washington, D.C.

[21] Appl. No.: 329,624

[22] Filed: Nov. 12, 1981

[51] Int. Cl.⁵ .......................................... G01S 13/78
[52] U.S. Cl. .................................... 342/13; 342/45
[58] Field of Search .............. 343/6.5 R, 6.8 R, 18 E, 343/5 SA; 342/13, 45, 192

[56] References Cited

U.S. PATENT DOCUMENTS

| | | | |
|---|---|---|---|
| 3,750,163 | 7/1973 | Hecker | 342/45 |
| 3,905,035 | 9/1975 | Krumboltz et al. | 342/14 |
| 4,075,631 | 2/1978 | Dumez | 342/45 |
| 4,322,729 | 3/1982 | Honold et al. | 342/45 |
| 4,566,009 | 1/1986 | Hanni et al. | 342/45 |
| 4,862,176 | 8/1989 | Voles | 342/45 |
| 5,101,208 | 3/1992 | Parker et al. | 342/45 |

*Primary Examiner*—T. H. Tubbesing
*Attorney, Agent, or Firm*—Michael Zelenka; William H. Anderson

[57] ABSTRACT

A method and apparatus for preventing unauthorized sources from utilizing aircraft-borne I.F.F. for locating same. A bypass switch is inserted in the I.F.F. transponder antenna line which normally sends all incoming signals into a dummy load. Upon receipt of a proper interrogate command, the antenna is switched to the transponder.

3 Claims, 1 Drawing Sheet

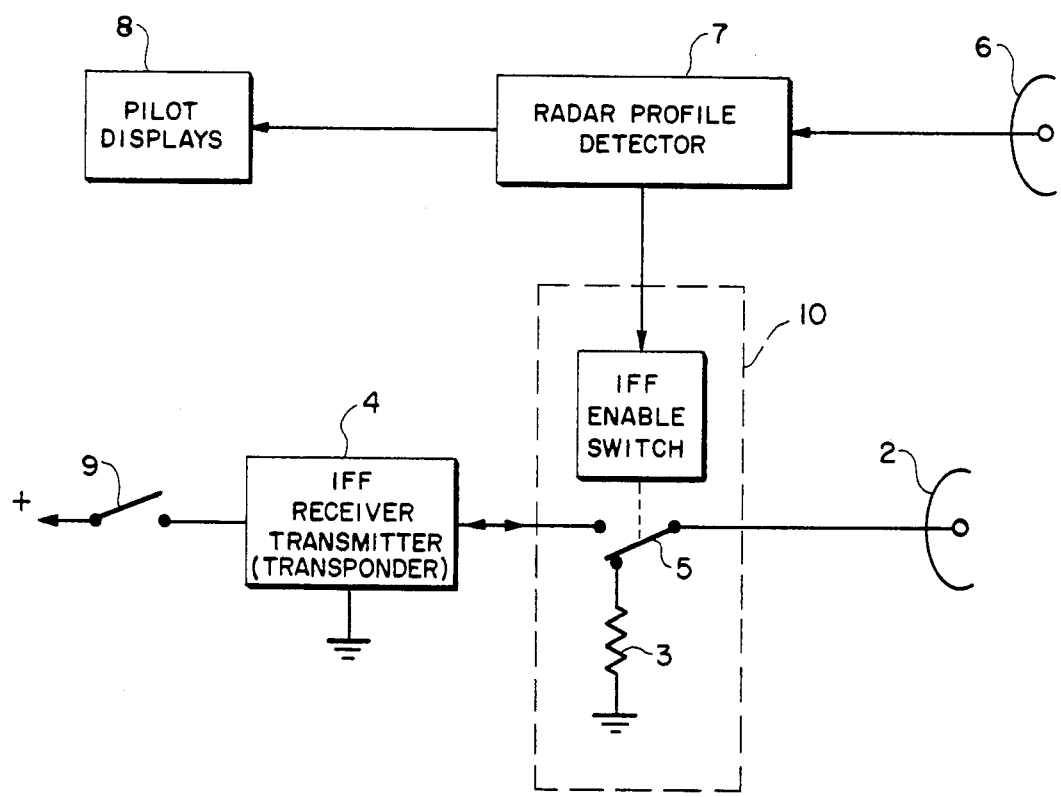

ANTI-EXPLOITATION METHOD AND APPARATUS FOR CONTROLLING AIRCRAFT IFF

FIELD OF THE INVENTION

The invention relates to identification Friend or Foe Systems generally and specifically to a system for safeguarding such systems.

DESCRIPTION OF THE PRIOR ART

The only prior method of performing the information protection described herein has been for the operator of an aircraft to disable (turn off) the affected system. This very act is highly unsatisfactory in as much as the system, when operating, acts to protect an aircraft from the very real danger of attack or otherwise unfriendly interest by friendly forces, visual identification being seldom relied upon currently.

SUMMARY

The instant invention enhances the ability of aircraft to remain undetected by reducing or limiting automatic operation of on board transmitters. Further it denies the information otherwise readily obtainable from the transmissions of such on-board from the transmissions of such on-board transponders known as IFF radios. IFF (Identification Friend or Foe) systems are carried by aircraft and consist of a receiver transmitter which, upon receipt of a coded request, transmits an identifying coded response. The idea is that only "friends" will be able to reply to ones request and, if no reply is received, then appropriate action is indicated. The request codes may, however, come into possession of unauthorized persons. This fact, combined with knowledge of the proper frequencies used, renders the system less useful for some of the purposes for which the system was designed, completely useless for others and very useful for a purpose never intended.

DETAILED DESCRIPTION OF THE INVENTION

The single FIGURE illustrates the present invention which resembles existing systems already carried by combat aircraft except for the components of block 10.

IFF transponder 4 receives a coded interrogate command thru antenna 2 and, if deemed proper by internal circuitry, automatically transmitts a coded response back through antenna 2. The intercept antenna 6 receives incoming signals and routes them to profile detector 7. Profile detector 7 normally provides outputs to pilot displays 8 which warn a pilot of EMF intercepts of the type generated by anti-aircraft missiles, among others. One of the criteria capable of use by profile detector 7 is the "electronic signature" of the intercepts which are the result of the simple act of manufacture of components or assemblies of radio-type equipment. This "signature" is as distinctive as a persons or possibly more so, but, they are generally alike for equipments made in the same place with the same components, etc. Thus, even though one manufacturer exactly duplicates anothers equipment, the signature of the copies article is different and can be detected.

The instant invention is a modification of the existing IFF system and intercept receiver. According to the invention, radar profile detector logic 7 is modified to provide an output to IFF disable switch 5 indicative of a "friendly" origin of intercepted signal Such a signal would cause switch 5 to connect the IFF antenna 2 to transponder 4. If the intercepted signal had been IFF interrogate signal and from a "friend", then the IFF would function and transmit its identifying response. Had such an interrogate signal come from a "foe" source, then the switch 5 would have remained in the position shown in the drawing and the signal would be dissipated in dummy load 3. The reaction times of the intercept receiver logic 7 has a response time on the order of a few tens of miliseconds; sufficient time to receive and reply to proper IFF interrogators.

Having thus disclosed my invention, I claim:

1. A method of preventing exploitation of IFF by unauthorized sources while still providing IFF to authorized sources comprising:

monitoring relevant electromagnetic wavelength bands for transmissions;

comparing IFF interrogate signals received to known electronic signature profiles which characterize their origin;

generating an output characterizing whether a received IFF interrogate signal had acceptable origins, and;

utilizing said output to control the operation of said IFF.

2. The method of claim 1 further comprising;

maintaining said IFF nonfunctional until receipt of an IFF interrogation from acceptable origins.

3. Apparatus for preventing exploitation of IFF by unauthorized sources while still providing IFF to authorized sources comprising:

An IFF transponder system including IFF antenna, IFF signal transmission means, and an IFF transponder;

Intercept receiver means for receiving and determining characteristics of received electromatic transmissions including an intercept antenna, intercept signal transmission means, intercept receiver logic circuit means for comparing intercepted transmissions to known electronic signature profiles and providing outputs indicative thereof, and display means for receiving said outputs and displaying outputs to an operator;

said IFF signal transmission means further comprising:

switch means including switch operator means and switch contacts responsive to said operator for selectively providing a signal path between said IFF antenna and said IFF transponder or between said IFF antenna and a dummy load;

said switch operator means operatively receiving an output from said logic circuit means for controlling signal path selection of said contacts.

* * * * *